United States Patent
Klatt

(10) Patent No.: US 10,341,925 B2
(45) Date of Patent: Jul. 2, 2019

(54) PROVIDING COMMUNICATION SERVICES OF A MOBILE COMMUNICATION NETWORK TO A PLURALITY OF TELECOMMUNICATION DEVICES

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/500,536

(22) PCT Filed: Jul. 13, 2015

(86) PCT No.: PCT/EP2015/065940
§ 371 (c)(1),
(2) Date: Jan. 31, 2017

(87) PCT Pub. No.: WO2016/015982
PCT Pub. Date: Feb. 4, 2016

(65) Prior Publication Data
US 2017/0230882 A1 Aug. 10, 2017

(30) Foreign Application Priority Data
Aug. 1, 2014 (EP) .................................... 14179611

(51) Int. Cl.
*H04W 36/28* (2009.01)
*H04L 12/24* (2006.01)
(Continued)

(52) U.S. Cl.
CPC ......... *H04W 36/28* (2013.01); *H04L 41/0896* (2013.01); *H04L 41/5019* (2013.01);
(Continued)

(58) Field of Classification Search
CPC ..... H04W 36/28; H04W 48/18; H04W 8/183; H04W 36/22; H04W 36/24;
(Continued)

(56) References Cited

U.S. PATENT DOCUMENTS 7,444,669 B1 * 10/2008 Bahl .................. G06Q 20/3674
455/435.2
2003/0083041 A1    5/2003 Kumar et al.
(Continued)

FOREIGN PATENT DOCUMENTS

| CN | 1540899 A | 10/2004 |
| CN | 101594646 A | 12/2009 |

(Continued)

*Primary Examiner* — Mazda Sabouri
(74) *Attorney, Agent, or Firm* — Leydig, Voit & Mayer, Ltd.

(57) ABSTRACT

A method for providing communication services of a mobile communication network to a plurality of telecommunication devices includes: establishing a connection or initiating an exchange of data between the mobile communication network and the plurality of telecommunication devices; and prior to or upon establishing the connection or initiating the exchange of data, sending service capability information to one or more telecommunication devices of the plurality of telecommunication devices.

12 Claims, 1 Drawing Sheet

(51) Int. Cl.
*H04W 8/18* (2009.01)
*H04W 36/22* (2009.01)
*H04W 36/24* (2009.01)
*H04W 48/18* (2009.01)
*H04W 72/04* (2009.01)
*H04W 4/00* (2018.01)
*H04W 48/06* (2009.01)
*H04W 88/06* (2009.01)

(52) U.S. Cl.
CPC ........... *H04W 8/183* (2013.01); *H04W 36/22* (2013.01); *H04W 36/24* (2013.01); *H04W 48/18* (2013.01); *H04W 72/042* (2013.01); *H04L 41/5022* (2013.01); *H04L 41/5029* (2013.01); *H04W 4/00* (2013.01); *H04W 8/18* (2013.01); *H04W 48/06* (2013.01); *H04W 72/04* (2013.01); *H04W 88/06* (2013.01)

(58) Field of Classification Search
CPC ... H04W 72/042; H04W 48/06; H04W 72/04; H04W 88/06; H04W 4/00; H04W 8/18; H04L 41/5019; H04L 41/0896; H04L 41/5029; H04L 41/5022
See application file for complete search history.

(56) References Cited

U.S. PATENT DOCUMENTS

| | | | |
|---|---|---|---|
| 2004/0205004 A1* | 10/2004 | Bahl | G06Q 20/3674 380/44 |
| 2004/0216099 A1 | 10/2004 | Okita et al. | |
| 2005/0276229 A1 | 12/2005 | Torabi | |
| 2009/0296682 A1 | 12/2009 | Morise | |
| 2011/0176528 A1 | 7/2011 | Lu et al. | |
| 2012/0093305 A1 | 4/2012 | Roth et al. | |
| 2012/0115481 A1 | 5/2012 | Kim et al. | |
| 2013/0070644 A1* | 3/2013 | McCann | H04W 48/16 370/255 |
| 2013/0100895 A1 | 4/2013 | Aghili et al. | |
| 2015/0249750 A1* | 9/2015 | Kakadia | H04M 15/805 455/406 |

FOREIGN PATENT DOCUMENTS

| | | |
|---|---|---|
| EP | 1626597 A1 | 2/2006 |
| JP | 2012532554 A1 | 12/2012 |
| JP | 2014140240 A | 7/2014 |
| WO | WO 2007043117 A1 | 4/2007 |
| WO | WO 2014008346 A1 | 1/2014 |

\* cited by examiner

PROVIDING COMMUNICATION SERVICES OF A MOBILE COMMUNICATION NETWORK TO A PLURALITY OF TELECOMMUNICATION DEVICES

CROSS-REFERENCE TO RELATED APPLICATIONS

This application is a U.S. National Phase application under 35 U.S.C. § 371 of International Application No. PCT/EP2015/065940, filed on Jul. 13, 2015, and claims benefit to European Patent Application No. EP 14179611.0, filed on Aug. 1, 2014. The International Application was published in English on Feb. 4, 2016 as WO 2016/015982 A1 under PCT Article 21(2).

FIELD

The present invention relates to a method for providing communication services of a mobile communication network to a plurality of telecommunication devices, wherein the mobile communication network is able to offer a plurality of available service capabilities to the plurality of telecommunication devices or to a subset of the plurality of telecommunication devices, the available service capabilities corresponding to groups of service capabilities such that the mobile communication network provides a varying degree of mobility functionality and/or a different quality of service levels and/or different levels of security measures and/or a varying degree of identity handling.

Furthermore, the present invention relates to a mobile communication network for providing communication services to a plurality of telecommunication devices, wherein the mobile communication network is able to offer a plurality of available service capabilities to the plurality of telecommunication devices or to a subset of the plurality of telecommunication devices, the available service capabilities corresponding to groups of service capabilities such that the mobile communication network provides a varying degree of mobility functionality and/or a different quality of service levels and/or different levels of security measures and/or a varying degree of identity handling.

Additionally, the present invention relates to a telecommunication device adapted to be used in connection with such a mobile communication network, and to a system comprising a mobile communication network and a plurality telecommunication devices.

Furthermore, the present invention relates to a program and to a computer program product for providing communication services of a mobile communication network to a plurality of telecommunication devices.

BACKGROUND

Within the framework of the fifth generation of mobile networks or mobile communication networks, a mobile communication network has to fulfill a broad range of requirements beyond what has been required for previous generations of mobile communication networks.

The range of requirements includes the support of efficient usage of bandwidth beginning from a data rate of a few kilobits per second up to a data rate of several Gigabits per second, from highly demanding latency requirements down to 1 ms to far less stringent delay requirements for some application like machine-to-machine communication (M2M-communication) where only several bytes per day need to be transferred in a not very time critical manner. Mobility requirements range from stationary or almost stationary scenarios with millions of connected devices (Internet of Things) to highest speed mobile broadband connection in fast moving cars or trains.

Given this broad range of applicable requirements, it is a challenge to provide a mobile communication network that fulfills these very different requirements still in a very efficient manner.

SUMMARY

In an exemplary embodiment, the present invention provides a method for providing communication services of a mobile communication network to a plurality of telecommunication devices. The method includes: establishing a connection or initiating an exchange of data between the mobile communication network and the plurality of telecommunication devices; and prior to or upon the establishing the connection or initiating the exchange of data, sending service capability information to one or more telecommunication devices of the plurality of telecommunication devices. The mobile communication network comprises an access network and a core network, the access network comprising a plurality of radio cells of the mobile communication network. The mobile communication network is configured to offer a plurality of available service capabilities to the plurality of telecommunication devices or to a subset of the plurality of telecommunication devices, the available service capabilities corresponding to groups of service capabilities, the groups of service capabilities including: the mobile communication network providing a varying degree of mobility functionality; the mobile communication network providing different quality of service levels; the mobile communication network providing different levels of security measures; and the mobile communication network providing a varying degree of identity handling. The service capability information indicates at least part of the available service capabilities within the groups of service capabilities to the one or more telecommunication devices of the plurality of telecommunication devices.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
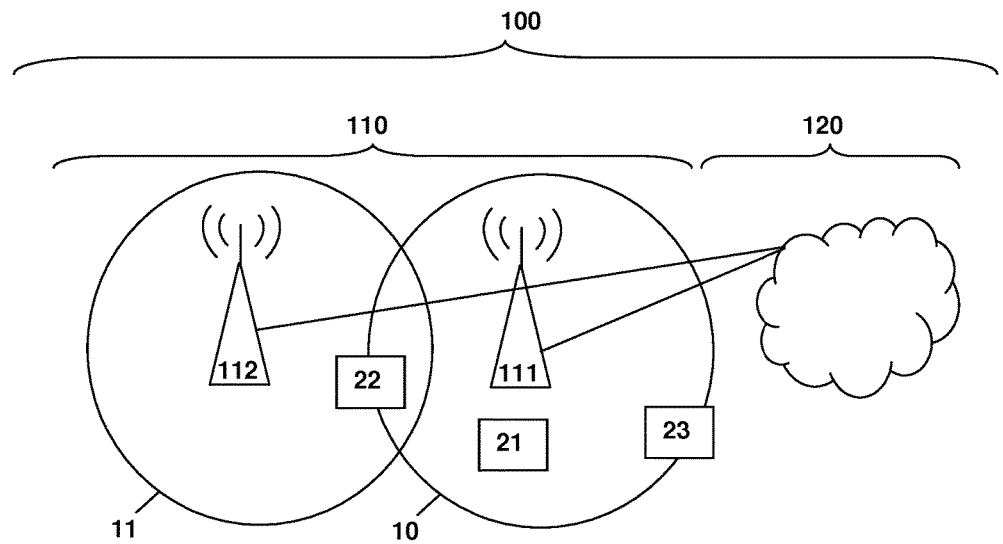
FIG. 1 schematically illustrates a mobile communication network and a plurality of telecommunication devices.

Exemplary embodiments of the present invention provide a technically simple, effective and especially cost effective solution for providing communication services of a mobile communication network to a plurality of telecommunication devices such that a differentiation of providing the communication services according to the respective requirements of the telecommunication devices is possible, especially with regard to service capabilities of the mobile communication network corresponding to groups of service capabilities such that the mobile communication network provides a varying degree of mobility functionality and/or a different quality of service levels and/or different levels of security measures and/or a varying degree of identity handling. Exemplary embodiments of the present invention provide a possibility to allow a mobile radio network (or mobile communication network), especially a fifth generation mobile radio network, to expose its network service capabilities to the outside world and further to allow on-demand provision of network services (or service capabilities) to telecommunication devices.

In an exemplary embodiment, the present invention provides a method for providing communication services of a mobile communication network to a plurality of telecommunication devices, wherein the mobile communication network comprises an access network and a core network, the access network comprising a plurality of radio cells of the mobile communication network, wherein the mobile communication network is able to offer a plurality of available service capabilities to the plurality of telecommunication devices or to a subset of the plurality of telecommunication devices, the available service capabilities corresponding to groups of service capabilities, the groups of service capabilities including at least the mobile communication network providing a varying degree of mobility functionality,
the mobile communication network providing different quality of service levels,
the mobile communication network providing different levels of security measures,
the mobile communication network providing a varying degree of identity handling, wherein the method comprises the step of establishing a connection or initiating an exchange of data between the mobile communication network and the plurality telecommunication devices, wherein prior to or upon the establishment of the connection or
the initiation of the exchange of data a service capability information is sent from the mobile communication network to at least part of the telecommunication devices of the plurality of telecommunication devices, wherein the service capability information indicates at least part of the available service capabilities—within the groups of service capabilities—to the telecommunication devices of the plurality of telecommunication devices.

It is thereby advantageously possible according to the present invention that a flexible method for providing communication services of a mobile communication network is provided such that the mobile communication network offers and is able to provide a plurality of available service capabilities in groups of service capabilities, and thereby offering or being able to provide a varying degree of mobility functionality and/or different quality of service levels and/or different levels of security measures and/or a varying degree of identity handling.

Depending on the use case of the telecommunication device, different network service capabilities can be exposed to particular (mobile) devices which in turn, depending on their use case, can book such services (or service capabilities) and be provisioned with the related service capabilities.

An advantage of exemplary embodiments of the present invention compared to current methods and/or systems is that depending on the use case and depending on the specific set of service capabilities used by a specific telecommunication device procedures can be skipped due to the fact that they are unnecessary for this given use case. It is thereby advantageously possible, that the system definition and implementation can be significantly simplified.

A simple scenario according to the present invention is the applicability of different mobility-related capabilities of the mobile communication network of telecommunication devices with no data loss. E.g. while it is clear that a mobile device like a smartphone requires full mobility support (as the user might use the device while travelling with full speed), a stationary metering sensor typically has no mobility requirements at all thus, regarding the group of mobility-related service capabilities of the mobile communication network, different service capabilities should be applied to different telecommunication devices when providing communication services to such devices.

In all conventionally known cellular systems (e.g. of the third generation mobile communication networks and/or of the fourth generation mobile communication networks), the underlying assumption has always been that there is typically no differentiation in terms of support of generic features like mobility, link layer reliability by for example retransmission, authentication and security requirements.

In this regard, a set of given network features (or set of service capabilities of the conventionally known mobile communication networks) for the above mentioned application scenario have always been utilized by all different telecommunication devices for any requested service.

Capabilities of the mobile communication network have in conventionally known mobile communication networks never been exposed in this sense to the telecommunication devices as the underlying assumption has always been that the terminal (or telecommunication device) has to utilize the network features typically always.

According to the present invention however, the method comprises the step of establishing a connection or initiating an exchange of data between the mobile communication network and the plurality telecommunication devices such that—prior to or upon either the establishment of the connection or the initiation of the exchange of data—a service capability information is sent from the mobile communication network to at least part of the telecommunication devices of the plurality of telecommunication devices, wherein the service capability information indicates at least part of the available service capabilities—within the groups of service capabilities—to the telecommunication devices of the plurality of telecommunication devices.

Thereby, it is advantageously possible that there is an exchange of information between the mobile communication network and the telecommunication device such that a differentiation of the service capabilities of the mobile communication network towards this telecommunication device (with respect to the service capabilities of the mobile communication network towards other telecommunication devices within the mobile communication network) is possible.

According to a preferred embodiment of the present invention, the service capability information is transmitted, by an entity or by a network node of the access network of the mobile communication network, especially via a dedicated signalization or on a broadcast control channel (BCCH) such that the broadcast control channel is received by the respective telecommunication device of the plurality of telecommunication devices.

Thereby, it is advantageously possible that the transmission of the service capability information is via a dedicated signalization, i.e. the transmission is provided specifically for a specific telecommunication device. Alternatively or cumulatively, it is also possible according to the present invention that the transmission of the service capability information is provided via a broadcast such as on a broadcast control channel (BCCH); the broadcast control channel being typically received by a plurality of telecommunication devices (this plurality of telecommunication devices comprising the respective telecommunication device).

According to the present invention it is furthermore preferred that a service capability selection information is sent to the access network by at least a first telecommunication device of the plurality of telecommunication devices, the service capability selection information at least implicitly indicating one or a plurality of service capabilities in at least one group of service capabilities.

It is thereby advantageously possible that the telecommunication device transmits a choice regarding the offered service capabilities of the mobile communication network by transmitting the service capability selection information.

It is possible and preferred according to the present invention that by transmitting the service capability selection information, a set of choices (regarding different groups of service capabilities) of the telecommunication device is transmitted to the mobile communication network. However, it is also possible and preferred that the service capability selection information only relates to the choice of a service capability in one of the groups of service capabilities.

According to the present invention it is preferred that either the service capability information includes a charging information, the charging information being related to different service capabilities and especially the charging information indicating different charging levels for different available service capabilities.

It is thereby advantageously possible to provide not only the possible service capabilities (within the groups of service capabilities) available to the telecommunication device but also additional information such as corresponding charging information indicating different charging levels for different available service capabilities.

According to a preferred embodiment of the present invention, the group of service capabilities related to the mobile communication network providing a varying degree of mobility functionality to at least part of the telecommunication devices includes one or a plurality out of the following:
  no mobility support,
  best effort mobility support,
  support of context forwarding,
  full mobility support without target radio cell preparation,
  full mobility support with target radio cell preparation,
  full mobility support without target radio cell preparation also in case that the target radio cell is congested.

Thereby, it is advantageously possible to provide a broad range of different service capabilities related to mobility functionality.

According to a further preferred embodiment of the present invention, the group of service capabilities related to the mobile communication network providing different quality of service levels to at least part of the telecommunication devices includes one or a plurality out of the following:
  no defined Quality of Service ("best effort"),
  guaranteed bitrate,
  minimum bitrate,
  priority of data handling low,
  priority of data handling normal,
  priority of data handling high,
  maximum packet delay allowed.

Thereby, it is advantageously possible to provide a broad range of different service capabilities related to different quality of service levels.

According to a further preferred embodiment of the present invention, the group of service capabilities related to the mobile communication network providing different levels of security measures to at least part of the telecommunication devices includes one or a plurality out of the following:
  no security support at all,
  low level security support,
  high level security support,
  high integrity protection security support.

Thereby, it is advantageously possible to provide a broad range of different service capabilities related to different levels of security measures.

According to a further preferred embodiment of the present invention, the group of service capabilities related to the mobile communication network providing a varying degree of identity handling to at least part of the telecommunication devices includes one or a plurality out of the following:
  no identity support by the mobile communication network,
  identity supported by the mobile communication network.

Thereby, it is advantageously possible to provide a broad range of different service capabilities related to different levels of identity handling.

According to still a further embodiment of the present invention, subsequent to the service capability information being sent in a first situation of the mobile communication network, a further service capability information is sent from the mobile communication network to at least part of the telecommunication devices of the plurality of telecommunication devices, wherein the further service capability information—compared to the service capability information—
  either indicates different available service capabilities within the groups of service capabilities, especially reflecting the situation—especially the network load—of the mobile communication network at the time of the further service capability information,
  or indicates a different charging information related to different available service capabilities within the groups of service capabilities, especially reflecting the situation—especially the network load—of the mobile communication network at the time of the further service capability information.

Thereby it is advantageously possible according to the present invention to flexibly adapt the communication of service capabilities, by the mobile communication network, to the telecommunication devices, especially reflecting different situations of the mobile communication network, especially different network load situations of the mobile communication network.

Furthermore, the present invention relates to a mobile communication network for providing communication services to a plurality of telecommunication devices, wherein the mobile communication network comprises an access network and a core network, the access network comprising a plurality of radio cells of the mobile communication network, wherein the mobile communication network is able to offer a plurality of available service capabilities to the plurality of telecommunication devices or to a subset of the plurality of telecommunication devices, the available service capabilities corresponding to groups of service capabilities, the groups of service capabilities including at least the mobile communication network providing a varying degree of mobility functionality, the mobile communication network providing different quality of service levels, the mobile communication network providing different levels of security measures, the mobile communication network providing a varying degree of identity handling, wherein the mobile communication network is configured such that—between the mobile communication network and the plurality telecommunication devices—a connection is established or an exchange of data is initiated, wherein prior to or upon the establishment of the connection or the initiation of the exchange of data a service capability information is sent from the mobile communication network to at least part of the telecommunication devices of the plurality of telecommunication devices, wherein the service capability information indicates at least part of the available service capabilities—within the groups of service capabilities—to the telecommunication devices of the plurality of telecommunication devices.

Thereby, it is advantageously possible to provide a mobile communication network such that more flexibility is achieved for providing communication services of the mobile communication network such that the mobile communication network offers and is able to provide a plurality of available service capabilities in groups of service capabilities, and thereby offering or being able to provide a varying degree of mobility functionality and/or a different quality of service levels and/or different levels of security measures and/or a varying degree of identity handling.

According to a further preferred embodiment of the present invention—especially with respect to the inventive mobile communication network—a service capability selection information is received by the access network from at least a first telecommunication device of the plurality of telecommunication devices, the service capability selection information at least implicitly indicating one or a plurality of service capabilities in at least one group of service capabilities.

Thereby, it is advantageously possible according to the present invention that an exchange of service capability information and a corresponding choice (via the service capability selection information) is possible in order to provide a finer granularity regarding the provision of communication services to different (kinds of) telecommunication devices.

Furthermore, the present invention relates to a telecommunication device adapted to be used in connection with a mobile communication network that provides communication services to a plurality of telecommunication devices, wherein the telecommunication device and the plurality of telecommunication devices are configured to communicate with the mobile communication network via an access network of the mobile communication network, the access network comprising a plurality of radio cells, wherein the mobile communication network is able to offer a plurality of available service capabilities to the telecommunication device and the plurality of telecommunication devices or to a subset of the plurality of telecommunication devices, the available service capabilities corresponding to groups of service capabilities, the groups of service capabilities including at least the mobile communication network providing a varying degree of mobility functionality, the mobile communication network providing different quality of service levels, the mobile communication network providing different levels of security measures, the mobile communication network providing a varying degree of identity handling, wherein the telecommunication device is configured to establish a connection or to initiate an exchange of data with the mobile communication network, wherein prior to or upon the establishment of the connection or the initiation of the exchange of data a service capability information is received, by the telecommunication device, from the mobile communication network, wherein the service capability information indicates at least part of the available service capabilities—within the groups of service capabilities—to the telecommunication device, and wherein a service capability selection information is sent by the telecommunication device to the access network, the service capability selection information at least implicitly indicating one or a plurality of service capabilities in at least one group of service capabilities.

Thereby, it is advantageously possible to provide a mobile communication network such that more flexibility is achieved for providing communication services of the mobile communication network such that the mobile communication network offers and is able to provide a plurality of available service capabilities in groups of service capabilities, and thereby offering or being able to provide a varying degree of mobility functionality and/or a different quality of service levels and/or different levels of security measures and/or a varying degree of identity handling.

Furthermore, the present invention relates to a system for providing communication services of a mobile communication network to a plurality of telecommunication devices, wherein the system comprises a mobile communication network and a plurality of telecommunication device, wherein the mobile communication network comprises an access network and a core network, the access network comprising a plurality of radio cells of the mobile communication network, wherein the mobile communication network is able to offer a plurality of available service capabilities to the plurality of telecommunication devices or to a subset of the plurality of telecommunication devices, the available service capabilities corresponding to groups of service capabilities, the groups of service capabilities including at least the mobile communication network providing a varying degree of mobility functionality, the mobile communication network providing different quality of service levels, the mobile communication network providing different levels of security measures, the mobile communication network providing a varying degree of identity handling, wherein the system is configured such that—between the mobile communication network and the plurality telecommunication devices—a connection is established or an exchange of data is initiated, wherein prior to or upon the establishment of the connection or the initiation of the exchange of data a service capability information is sent from the mobile communication network to at least part of the telecommunication devices of the plurality of telecommunication devices, wherein the service capability information indicates at least part of the available service capabilities—within the groups of service capabilities—to the telecommunication devices of the plurality of telecommunication devices.

Thereby, it is advantageously possible to provide a system such that more flexibility is achieved for providing communication services of the mobile communication network to telecommunication devices such that the mobile communication network offers and is able to provide a plurality of available service capabilities in groups of service capabilities, and thereby offering or being able to provide a varying degree of mobility functionality and/or a different quality of service levels and/or different levels of security measures and/or a varying degree of identity handling.

Additionally, the present invention relates to a program comprising a computer readable program code which, when executed on a computer and/or on a network node or on a plurality of network nodes of a mobile communication network and/or on a telecommunication device, or in part on a network node or on a plurality of network nodes of a mobile communication network and in part on a telecommunication device, causes the computer and/or network node or the plurality of network nodes and/or the telecommunication device to perform the inventive method.

Still additionally, the present invention relates to a computer program product for providing communication services of a mobile communication network to a plurality of telecommunication devices, the computer program product comprising a computer program stored on a storage medium, the computer program comprising program code which, when executed on a computer and/or on a network node or on a plurality of network nodes of a mobile communication network and/or on a telecommunication device, or in part on a network node or on a plurality of network nodes of a mobile communication network and in part on a telecommunication device, causes the computer and/or network node or the plurality of network nodes and/or the telecommunication device to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network 100, is schematically shown, the mobile communication network 100 comprising an access network 110 and a core network 120. The mobile communication network 100 is preferably a cellular telecommunications network comprising typically a plurality of network cells (or radio cells), wherein two neighboring network cells (or radio cells) are represented in FIG. 1 by means of reference signs 10 and 11. The mobile communication network 100 typically comprises a plurality of user equipments or telecommunication devices. The plurality of user equipments or of telecommunication devices are referred to by means of reference signs 21, 22, 23, wherein reference sign 21 refers to a first user equipment or a first telecommunication device, reference sign 22 refers to a second user equipment or a second telecommunication device, reference sign 23 refers to a third user equipment or a third telecommunication device. The access network 110 of the mobile communication network 100 comprises, in the exemplary representation of FIG. 1, a first base station entity 111, serving the (first) radio cell 10. Furthermore, a neighbor (second) base station entity 112, serving the neighbor (second) radio cell 11, is schematically shown. The base transceiver stations 111, 112 are typically base stations or base station entities, e.g. a NodeB or an eNodeB base transceiver station.

In order for the mobile communication network 100 to provide communication services to the telecommunication devices 21, 22, 23, a connection is established between the mobile communication network 100 and one or a plurality of the telecommunication devices 21, 22, 23 and/or an exchange of data is initiated between the mobile communication network 100 and one or a plurality of the telecommunication devices 21, 22, 23.

According to the present invention, prior to the establishment of a connection between one of the telecommunication devices 21, 22, 23 with the mobile communication network 100, or upon the establishment of a connection between one (or a plurality) of the telecommunication devices 21, 22, 23 with the mobile communication network 100, a service capability information (hereinafter designated by means of reference sign 201, cf. FIG. 2) is sent from the mobile communication network 100 to the one (or the plurality) of the telecommunication devices 21, 22, 23, the service capability information 201 indicating at least part of the available service capabilities of the mobile communication network 100—within the groups of service capabilities—to the one (or the plurality) of the telecommunication devices 21, 22, 23.

Alternatively or cumulatively, prior to the initiation of the exchange of data between one of the telecommunication devices 21, 22, 23 with the mobile communication network 100, or upon the initiation of the exchange of data between one (or a plurality) of the telecommunication devices 21, 22, 23 with the mobile communication network 100, a service capability information 201 is sent from the mobile communication network 100 to the one (or the plurality) of the telecommunication devices 21, 22, 23, the service capability information 201 indicating at least part of the available service capabilities of the mobile communication network 100—within the groups of service capabilities—to the one (or the plurality) of the telecommunication devices 21, 22, 23.

The mobile communication network 100 is able to offer a plurality of available service capabilities, either to all of the telecommunication devices 21, 22, 23 or to a subset of the telecommunication devices 21, 22, 23. The available service capabilities correspond to groups of service capabilities. According to the present invention, the groups of service capabilities include at least the mobile communication network 100 providing a varying degree of mobility functionality and/or the mobile communication network 100 providing different quality of service levels and/or the mobile communication network 100 providing different levels of security measures and/or the mobile communication network 100 providing a varying degree of identity handling.

Preferably, the service capability information 201 is transmitted via a dedicated signalization or on a broadcast control channel (BCCH) such that the broadcast control channel is received by at least part of the telecommunication devices 21, 22, 23. The service capability information 201 is preferably transmitted using SIBs (System Information Blocks) of the broadcast control channel (typically via specific broadcast messages that are capable of providing this information on the broadcast control channel). Alternatively or cumulatively, the service capability information 201 can be transmitted via dedicated signalization (e.g. context activation of specific telecommunication devices 21, 22, 23).

It is furthermore preferred that a service capability selection information (hereinafter designated by means of reference sign 202, cf. FIG. 2) is sent to the access network 110 by at least one of the telecommunication devices 21, 22, 23 (e.g. the first telecommunication device 21 or the second telecommunication device 22). The service capability selection information 202 at least implicitly indicates one or a plurality of service capabilities in at least one group of service capabilities that the (first or second) telecommunication device 21, 22 choses (or books).

Figure 2:
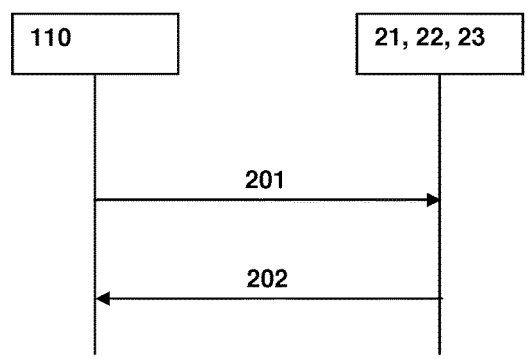
FIG. 2 schematically illustrates an exchange of information between a mobile communication network and telecommunication devices.

In FIG. 2, the exchange of information between the mobile communication network 100 and the telecommunication devices 21, 22, 23 (or at least part thereof, i.e. the first and/or the second and/or the third telecommunication device 21, 22, 23) is schematically shown by means of a communication diagram. At a given first point in time, the service capability information 201 is transmitted from the mobile communication network 100 (i.e. a network node of the mobile communication network, typically a network node of the access network 110) to the telecommunication devices 21, 22, 23 (or at least part thereof, i.e. the first and/or the second and/or the third telecommunication device 21, 22, 23). At a given second point in time, the service capability selection information 202 is transmitted from at least one of the telecommunication devices 21, 22, 23 to the mobile communication network 100, typically a network node of the access network 110. The first given point in time can be equal for all the telecommunication devices 21, 22, 23 within a radio cell 10, 11 and the service capability information 201 transmitted via a broadcast transmission within the radio cell 10, 11. The second given point in time can vary for each telecommunication device 21, 22, 23 individually, i.e. the transmission of the service capability selection information 202 might occur at different points in time for different telecommunication devices 21, 22, 23.

The bookable services or service capabilities (within certain groups of service capabilities) typically vary according the use case and/or the access mode (such as mobile access, wireless local area network (WLAN) hot spot access or machine-to-machine use cases). It is likewise possible and preferred according to the present invention that for specific classes of telecommunication devices 21, 22, 23 (such as, e.g., machine-to-machine enabled devices such as smart meters, sensors or the like) different service capabilities and/or different groups of service capabilities (e.g. only service capabilities of the group of service capabilities providing different degrees of identity handling for machine-to-machine enabled telecommunication device) are offered (via the service capability information 201) by the mobile communication network 100—compared to other classes of telecommunication devices 21, 22, 23 (such as, e.g., smart phones for which all groups of service capabilities are offered by the service capability information 201). Additionally or cumulatively, it is possible and preferred that a selection of suitable service capabilities is performed by the telecommunication devices 21, 22, 23.

A first example of possible use cases relates to smart metering via machine-to-machine communication, i.e. using machine type communication enabled telecommunication devices 21, 22, 23. For this use case, the group of service capabilities providing a varying degree of identity handling should be offered by the mobile communication network 100 and/or selected by the telecommunication devices 21, 22, 23.

Another example of possible use cases relates to container tracking via machine-to-machine communication, i.e. using machine type communication enabled telecommunication devices 21, 22, 23. For this use case, the groups of service capabilities providing
  a varying degree of mobility functionality,
  different levels of security measures, and
  a varying degree of identity handling
should be offered by the mobile communication network 100 and/or selected by the telecommunication devices 21, 22, 23.

Still another example of possible use cases relates to the usage of smart phones. For this use case, the groups of service capabilities providing
  a varying degree of mobility functionality,
  different quality of service levels,
  different levels of security measures, and
  a varying degree of identity handling
should be offered by the mobile communication network 100 and/or selected by the telecommunication devices 21, 22, 23.

Examples of the group of service capabilities related to the mobile communication network 100 providing a varying degree of mobility functionality includes one or a plurality out of the following:
  no mobility support (e.g. the user equipment or telecommunication device has to select the next radio cell if the serving radio cell is left autonomously),
  best effort mobility support (e.g. the mobile communication network 100 provides candidate radio cells for cell selection, other mobility related functionality is terminal based),
  support of context forwarding (e.g. once the user equipment or telecommunication device has picked up a new radio cell, no new registration is required (unlike for the above mentioned scenarios), but available context is fetched from the previous radio cell),
  full mobility support (e.g. controlled by the mobile communication network 100) without target radio cell preparation,
  full mobility support (e.g. controlled by the mobile communication network 100) with target radio cell preparation,
  full mobility support (e.g. controlled by the mobile communication network 100) without target radio cell preparation also in case that the target radio cell is congested (in order to guarantee seamless handover without packet loss).

Examples of the group of service capabilities related to the mobile communication network 100 providing different quality of service levels includes one or a plurality out of the following:
  no defined Quality of Service ("best effort"),
  guaranteed bitrate,
  minimum bitrate,
  priority of data handling low,
  priority of data handling normal,
  priority of data handling high,
  maximum packet delay allowed.

Examples of the group of service capabilities related to the mobile communication network 100 providing different levels of security measures includes one or a plurality out of the following:
  no security support at all (e.g. no ciphering and integrity protected by the network provided),
  low level security support (e.g. 64 bits ciphering provided by the network provided),
  high level security support (e.g. 512 bits ciphering provided by the network provided),
  high integrity protection security support (e.g. all messages and user data is integrity protected to avoid fake messages and data on a connection).

Examples of the group of service capabilities related to the mobile communication network 100 providing a varying degree of identity handling includes one or a plurality out of the following:
  no identity support by the mobile communication network 100,
  identity supported by the mobile communication network 100 (e.g. the network operator guaranties the identity of a telecommunication device (customer/device)).

According to the present invention, the service capabilities or groups of service capabilities offered by the mobile communication network 100 are selected by the telecommunication device 21, 22, 23 per connection and/or per application used by the telecommunication device 21, 22, 23. Furthermore according to the present invention, the service capabilities or groups of service capabilities offered by the mobile communication network 100 depend on the situation of the mobile communication network 100, typically on the current load of the mobile communication network 100, e.g. cyphering functionalities offered by the mobile communication network 100 could be offered at different rates depending on the current network load of the mobile communication network 100 (i.e. during off-peak times strong encryption might be offered cheaply).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing communication services of a particular mobile communication network to a plurality of telecommunication devices, the method comprising:
  establishing a connection or initiating an exchange of data between the particular mobile communication network and the plurality of telecommunication devices; and
  prior to or upon establishing the connection or initiating the exchange of data, sending service capability information from the particular mobile communication network to one or more telecommunication devices of the plurality of telecommunication devices;
  wherein the particular mobile communication network comprises an access network and a core network, the access network comprising a plurality of radio cells of the particular mobile communication network;
  wherein the particular mobile communication network is configured to offer a plurality of available service capabilities corresponding to the particular mobile communication network to the one or more telecommunication devices, including:
    the particular mobile communication network offering varying degrees of mobility functionality for selection;
    the particular mobile communication network offering different quality of service levels for selection;
    the particular mobile communication network offering different levels of security measures for selection; and
    the particular mobile communication network offering a varying degree of identity handling for selection;
  wherein the service capability information indicates at least part of the available service capabilities offered by the particular mobile communication network to the one or more telecommunication devices; and
  wherein the method further comprises: after sending the service capability information to the one or more telecommunication devices, receiving, from a telecommunication device of the one or more telecommunication devices, a selection corresponding to at least one offered available service capability;
  wherein the service capability information is sent in a first situation of the particular mobile communication network, and wherein the method further comprises: subsequent to sending the service capability information, sending further service capability information from the particular mobile communication network to the one or more telecommunication devices in a second situation of the particular mobile communication network, wherein the further service capability information, relative to the service capability information, indicates different available service capabilities offered by the particular mobile communication network or different charging information related to the available service capabilities.

2. The method according to claim 1, wherein the service capability information is transmitted, by an entity or by a network node of the access network of the particular mobile communication network, via a dedicated signalization or on a broadcast control channel (BCCH).

3. The method according to claim 1, wherein the service capability information includes charging information, the charging information indicating different charging levels for different available service capabilities.

4. The method according to claim 1, wherein the varying degrees of mobility functionality include one or a plurality of the following:
   no mobility support;
   best effort mobility support;
   support of context forwarding;
   full mobility support without target radio cell preparation;
   full mobility support with target radio cell preparation;
   full mobility support without target radio cell preparation also in case that the target radio cell is congested.

5. The method according to claim 1, wherein the different quality of service levels include one or a plurality of the following:
   no defined Quality of Service ("best effort");
   guaranteed bitrate;
   minimum bitrate;
   priority of data handling low;
   priority of data handling normal;
   priority of data handling high;
   maximum packet delay allowed.

6. The method according to claim 1, wherein the different levels of security measures include one or a plurality of the following:
   no security support at all;
   low level security support;
   high level security support;
   high integrity protection security support.

7. The method according to claim 1, wherein the varying degree of identity handling includes one or a plurality of the following:
   no identity support by the particular mobile communication network;
   identity supported by the particular mobile communication network.

8. The method according to claim 1, wherein different service capabilities being available or different charging information being related to the available service capabilities is based on a difference in network load.

9. A particular mobile communication network for providing communication services to a plurality of telecommunication devices, wherein the particular mobile communication network comprises:
   an access network; and
   a core network;
   wherein the access network comprises a plurality of radio cells of the particular mobile communication network;
   wherein the particular mobile communication network is configured to offer a plurality of available service capabilities corresponding to the particular mobile communication network to one or more telecommunication devices of the plurality of telecommunication devices, including:
      the particular mobile communication network offering varying degrees of mobility functionality for selection;
      the particular mobile communication network offering different quality of service levels for selection;
      the particular mobile communication network offering different levels of security measures for selection; and
      the particular mobile communication network offering a varying degree of identity handling for selection;
   wherein the particular mobile communication network is configured such that a connection is established or an exchange of data is initiated between the particular mobile communication network and the plurality telecommunication devices;
   wherein the particular mobile communication network is further configured such that prior to or upon the establishment of the connection or the initiation of the exchange of data, service capability information is sent from the particular mobile communication network to the one or more telecommunication devices, wherein the service capability information indicates at least part of the available service capabilities offered by the particular mobile communication network the one or more telecommunication devices; and
   wherein the particular mobile communication network is further configured such that after sending the service capability information to the one or more telecommunication devices, the particular mobile communication network receives, from a telecommunication device of the one or more telecommunication devices, a selection corresponding to at least one offered available service capability;
   wherein the service capability information corresponds to a first situation of the particular mobile communication network, and wherein the particular mobile communication network is further configured such that, subsequent to the service capability information being sent, further service capability information is sent from the particular mobile communication network to the one or more telecommunication devices in a second situation of the particular mobile communication network, wherein the further service capability information, relative to the service capability information, indicates different available service capabilities offered by the particular mobile communication network or different charging information related to the available service capabilities.

10. A system for providing communication services of a mobile communication network to a plurality of telecommunication devices, wherein the system comprises:
   a particular mobile communication network; and
   a plurality of telecommunication devices;
   wherein the particular mobile communication network comprises an access network and a core network, the access network comprising a plurality of radio cells of the particular mobile communication network;
   wherein the particular mobile communication network is configured to offer a plurality of available service capabilities corresponding to the particular mobile communication network to one or more telecommunication devices of the plurality of telecommunication devices, including:
      the particular mobile communication network offering varying degrees of mobility functionality for selection;
      the particular mobile communication network offering different quality of service levels for selection;
      the particular mobile communication network offering different levels of security measures for selection; and the particular mobile communication network offering a varying degree of identity handling for selection;

wherein the particular mobile communication network and the plurality of telecommunication devices are configured to establish a connection or initiate an exchange of data;

wherein the particular mobile communication network is further configured, prior to or upon the establishment of the connection or the initiation of the exchange of data, to send service capability information to one or more telecommunication devices, wherein the service capability information indicates at least part of the available service capabilities offered by the particular mobile communication network to the one or more telecommunication devices; and wherein the particular mobile communication network is further configured to receive, from a telecommunication device of the one or more telecommunication devices, a selection corresponding to at least one offered available service capability after sending the service capability information to the one or more telecommunication devices;

wherein the service capability information corresponds to a first situation of the particular mobile communication network, and wherein the particular mobile communication network is further configured to, subsequent to sending the service capability information, send further service capability information to the one or more telecommunication devices in a second situation of the particular mobile communication network, wherein the further service capability information, relative to the service capability information, indicates different available service capabilities offered by the particular mobile communication network or different charging information related to the available service capabilities.

11. A non-transitory computer-readable medium having processor-executable instructions stored thereon for providing communication services of a particular mobile communication network to a plurality of telecommunication devices, the processor-executable instructions, when executed, facilitating performance of the following:

establishing a connection or initiating an exchange of data between the particular mobile communication network and the plurality of telecommunication devices; and prior to or upon establishing the connection or initiating the exchange of data, sending service capability information from the particular mobile communication network to one or more telecommunication devices of the plurality of telecommunication devices;

wherein the particular mobile communication network comprises an access network and a core network, the access network comprising a plurality of radio cells of the particular mobile communication network;

wherein the particular mobile communication network is configured to offer a plurality of available service capabilities corresponding to the particular mobile communication network to the one or more telecommunication devices, including:

the particular mobile communication network offering varying degrees of mobility functionality for selection;

the particular mobile communication network offering different quality of service levels for selection;

the particular mobile communication network offering different levels of security measures for selection; and the particular mobile communication network offering a varying degree of identity handling for selection;

wherein the service capability information indicates at least part of the available service capabilities offered by the particular mobile communication network to the one or more telecommunication devices; and wherein the processor-executable instructions, when executed, further facilitate: after sending the service capability information to the one or more telecommunication devices, receiving, from a telecommunication device of the one or more telecommunication devices, a selection corresponding to at least one offered available service capability;

wherein the service capability information is sent in a first situation of the particular mobile communication network, and wherein the processor-executable instructions, when executed, further facilitate: subsequent to sending the service capability information, sending further service capability information from the particular mobile communication network to the one or more telecommunication devices in a second situation of the particular mobile communication network, wherein the further service capability information, relative to the service capability information, indicates different available service capabilities offered by the particular mobile communication network or different charging information related to the available service capabilities.

12. A telecommunication device comprising a processor and a non-transitory computer-readable medium having processor-executable instructions stored thereon, the processor-executable instructions, when executed by the processor, facilitating performance of the following:

establishing a connection or initiating an exchange of data between the particular mobile communication network and the telecommunications device; and prior to or upon establishing the connection or initiating the exchange of data, receiving service capability information from the particular mobile communication network;

wherein the particular mobile communication network is configured to offer a plurality of available service capabilities corresponding to the particular mobile communication network to the one or more telecommunication devices, including:

the particular mobile communication network offering varying degrees of mobility functionality for selection;

the particular mobile communication network offering different quality of service levels for selection;

the particular mobile communication network offering different levels of security measures for selection; and the particular mobile communication network offering a varying degree of identity handling for selection;

wherein the service capability information indicates at least part of the available service capabilities offered by the particular mobile communication network to the telecommunications device; and wherein the processor-executable instructions, when executed, further facilitate: after receiving the service capability information, sending a selection corresponding to at least one offered available service capability to the particular mobile communication network;

wherein the service capability information corresponds to a first situation of the particular mobile communication network, and wherein the processor-executable instructions, when executed, further facilitate: subsequent to receiving the service capability information, receiving further service capability information corresponding to a second situation of the particular mobile communication network from the particular mobile communication network, wherein the further service capability information, relative to the service capability information, indicates different available service capabilities offered by the particular mobile communication network or different charging information related to the available service capabilities.

* * * * *